(12) United States Patent
Zeng et al.

(10) Patent No.: US 11,527,941 B2
(45) Date of Patent: Dec. 13, 2022

(54) APPARATUS AND METHOD FOR ROTOR TEMPERATURE MEASUREMENT

(71) Applicant: GM Global Technology Operations LLC, Detroit, MI (US)

(72) Inventors: Wei Zeng, Oakland Township, MI (US); Scott E. Parrish, Farmington Hills, MI (US); Lei Hao, Troy, MI (US); Jeremie Dernotte, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 104 days.

(21) Appl. No.: 17/110,865

(22) Filed: Dec. 3, 2020

(65) Prior Publication Data

US 2022/0181950 A1  Jun. 9, 2022

(51) Int. Cl.
*H02K 11/25* (2016.01)
*G01J 5/00* (2022.01)

(52) U.S. Cl.
CPC ............ *H02K 11/25* (2016.01); *G01J 5/0022* (2013.01)

(58) Field of Classification Search
CPC .............................. H02K 11/25; G01J 5/0022
USPC ........................................................ 310/68 C
See application file for complete search history.

(56) References Cited

FOREIGN PATENT DOCUMENTS

| CN | 210958064 U | * | 7/2020 | |
| DE | 102013000949 A1 | * | 7/2014 | ............... G01K 1/14 |
| RU | 178708 U1 | * | 4/2018 | |
| WO | WO-2010006631 A | * | 1/2010 | ............ G01J 5/0022 |
| WO | 2017153018 A1 | | 9/2017 | |
| WO | WO-2017153018 A1 | * | 9/2017 | |

* cited by examiner

*Primary Examiner* — Mahmoud Gimie
(74) *Attorney, Agent, or Firm* — Vivacqua Crane PLLC

(57) ABSTRACT

An apparatus for automobile vehicle rotor temperature measurement includes a motor having a rotor. A stator has the rotor positioned within the stator. An aperture extends through the stator. A sensor is positioned in alignment with the aperture sensing a temperature of at least a surface of the rotor.

16 Claims, 3 Drawing Sheets

APPARATUS AND METHOD FOR ROTOR TEMPERATURE MEASUREMENT

INTRODUCTION

The present disclosure relates to measurement of electric motor rotor temperature during operation of the motor.

Electrical motors such as those used for propulsion of electrical vehicles including hybrid electric vehicles require accurate measurement of motor temperatures during operation to provide optimum motor performance, to avoid inducing thermal overprotection which could limit performance and to maximize motor life expectancy. The rotor is the most important element to track for temperature conditions during operation, however known techniques to measure motor temperature during operation do not provide for direct temperature measurement of the rotor surface area in the air gap due to inaccessibility of the rotor.

Production motors at present rely on thermal resistance network-based temperature estimators to provide input data to vehicle controllers. Known temperature measurement network-based temperature estimators include a back-EMF method which indirectly estimates a rotor magnet overall temperature for permanent magnet motors. A substantial drawback of the back-EMF method is this method requires power input to the motor to be stopped for a predetermined period of time, which is undesirable. Induction motors do not include permanent magnets in the rotor and at present a suitable method to measure rotor temperature is not available.

Thus, while current motor temperature measurement systems achieve their intended purpose, there is a need for a new and improved system and method for measurement of electric motor rotor temperature during operation of the motor.

SUMMARY

According to several aspects, an apparatus for automobile vehicle rotor temperature measurement includes a motor having a rotor. A stator is further included with the rotor positioned within the stator. A first aperture or opening extends through the stator. A sensor is positioned in alignment with the first aperture sensing a temperature of at least a surface of the rotor in a line-of-sight with the sensor.

In another aspect of the present disclosure, the first aperture defines a step aperture extending through the stator.

In another aspect of the present disclosure, a second aperture or opening extends through a housing supporting the sensor, with a diameter of the first aperture is smaller than a diameter of the second aperture.

In another aspect of the present disclosure, a stator surface is visible to the sensor through the second aperture.

In another aspect of the present disclosure, the first aperture is coaxially aligned with the second aperture and in a line-of-sight with the sensor.

In another aspect of the present disclosure, an air gap is created between a lens of the sensor and the rotor surface, the air gap minimizing heat transfer to the sensor from the rotor and providing a non-contact rotor temperature measurement in the air gap.

In another aspect of the present disclosure, the air gap is further located between a housing supporting the sensor and the surface of the rotor.

In another aspect of the present disclosure, the air gap is further provided between the lens of the sensor and the stator surface.

In another aspect of the present disclosure, the stator includes multiple teeth, with the aperture extending through at least one of the multiple teeth.

In another aspect of the present disclosure, the sensor can be an infrared detector.

According to several aspects, a method for automobile vehicle rotor temperature measurement for a motor having a rotor, includes: positioning the rotor within the stator; creating a first aperture or opening extending through the stator; aligning a sensor with the first aperture; and operating the sensor to sense a temperature of at least a surface of the rotor.

In another aspect of the present disclosure, the method further includes shaping the first aperture as a step aperture extending through the stator and including a second aperture or opening extending through a housing supporting the sensor, with a stator surface visible to the sensor through the second aperture.

In another aspect of the present disclosure, according to one example the method further includes selecting the sensor as an infrared detector sensing the surface of the rotor and the stator surface.

In another aspect of the present disclosure, the method further includes extending the aperture through at least one of multiple teeth of the stator.

In another aspect of the present disclosure, the method further includes receiving a total radiation $W_{tot}$ by the sensor equal to [an emission of surroundings reflected by a target defining the surface of the rotor]+[an emission of the target]+[an absorption through the atmosphere and external optics].

In another aspect of the present disclosure, the method further includes: assuming an initial reflected sensed temperature T_refl_initial of the rotor surface to be equal to a motor oil temperature $T_{oil}$ of the motor, or a stator temperature if a motor oil as a coolant oil is not used; and calculating a reflected temperature $T_{refl}$ which is equal to a constant $C_{refl}$ multiplied by [a rotor temperature $T_{rotor}$ plus a stator temperature $T_{stator}$] divided by two.

In another aspect of the present disclosure, the method further includes: substituting the calculated reflected temperature $T_{refl}$ for the initial reflected sensed temperature T_refl_initial of the rotor surface; and performing at least a second iteration of the calculating the reflected temperature $T_{refl}$.

According to several aspects, a method for automobile vehicle rotor temperature measurement of a motor having a rotor and a stator, includes: aligning an infrared sensor with a surface of the rotor; in an obtaining step obtaining multiple items from vehicle sensor data including a motor oil temperature $T_{oil}$ or a stator temperature if coolant oil is not used, an infrared sensor stator temperature signal IR_stator_raw, an infrared sensor rotor signal IR_rotor_raw, an object emissivity ε_obj of the rotor, a predetermined transmission rate τ_atm, an atmospheric temperature T_atm, and a temperature at the sensor T_optic, wherein an initial reflected sensed temperature T_refl_initial is assumed to be equal to the motor oil temperature $T_{oil}$ of the motor; performing a first temperature calibration if the motor oil temperature 54 $T_{oil}$ is less than 40° C. or a second temperature calibration if the motor oil temperature 54 $T_{oil}$ is equal to or greater than than 40° C; and calculating a value of a reflected temperature $T_{refl}$ which is equal to a constant $C_{refl}$ multiplied by [a rotor temperature $T_{rotor}$ plus a stator temperature $T_{stator}$] divided by two.

In another aspect of the present disclosure, the method further includes performing at least a second iteration following completion of the calculation of the reflected temperature $T_{refl}$ by returning to the obtaining step and replacing the initial reflected sensed temperature T_refl_initial initially assumed to be equal to the motor oil temperature $T_{oil}$ of the motor with the calculated value of $T_{refl}$.

In another aspect of the present disclosure, the method further includes extending a step-aperture in a stator lamination defining an infrared radiation pathway from the infrared sensor to enable simultaneous infrared sensing on the surface of the rotor and on a surface of the stator.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
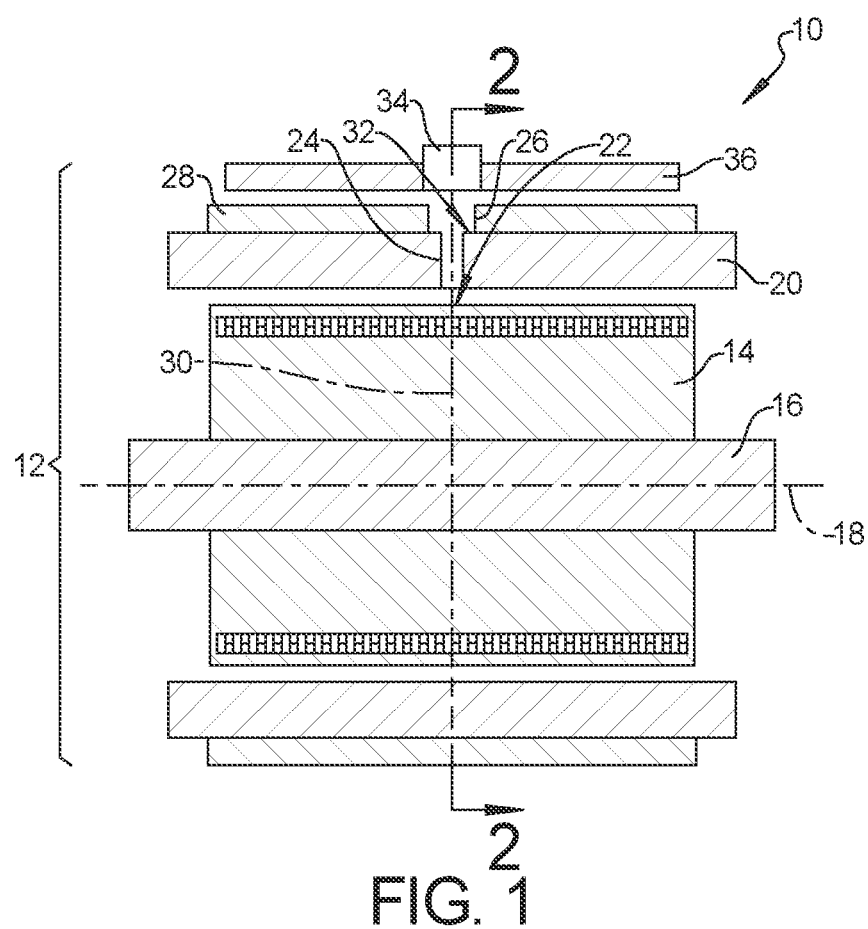
FIG. 1 is a front elevational view of a motor having an apparatus and method for rotor temperature measurement according to an exemplary aspect.

Referring to FIG. 1, an apparatus and method for rotor temperature measurement 10 according to several aspects includes a motor 12 having rotor 14 for rotating an output shaft 16 with respect to a shaft axis of rotation 18. The rotor 14 is positioned within a stator 20. To accurately and directly determine a rotor temperature $T_{rotor}$ at a rotor surface 22 a first through aperture 24 is created through the stator 20. The first through aperture 24 provides a line-of-sight access to the rotor surface 22. To accurately and directly determine a stator temperature $T_{stator}$ a second through aperture 26 is created through a housing 28 which supports the stator 20. According to several aspects, the first through aperture 24 and the second through aperture 26 are coaxially aligned on a common axis 30. The second through aperture 26 provides a line-of-sight access to a stator surface 32. To determine the rotor temperature $T_{rotor}$ at the rotor surface 22 and the stator temperature $T_{stator}$ at the stator surface 32 a sensor 34 such as an infrared sensor is mounted using a sensor mount 36 to the housing 28.

Referring to FIG. 2 and again to FIG. 1, the stator 20 includes multiple stator laminations 38 individually having an outer ring 40 and multiple inwardly extending lamination teeth 42. Multiple stator slots 44 are provided individually positioned between successive ones of the lamination teeth 42. Stator windings 46 made for example of copper wire are positioned within the stator slots 44. The first through aperture 24 is created for example by boring centrally through an exemplary one of the lamination teeth 42'. According to several aspects a first diameter of the first through aperture 24 is smaller than a second diameter of the second through aperture 26 which provides the line-of-sight access to the rotor surface 22 and the line-of-sight access to stator surface 32 by the sensor 34. According to several aspects the first diameter of the first through aperture 24 may range from approximately 1.0 mm to approximately 1.5 mm.

Figure 2:
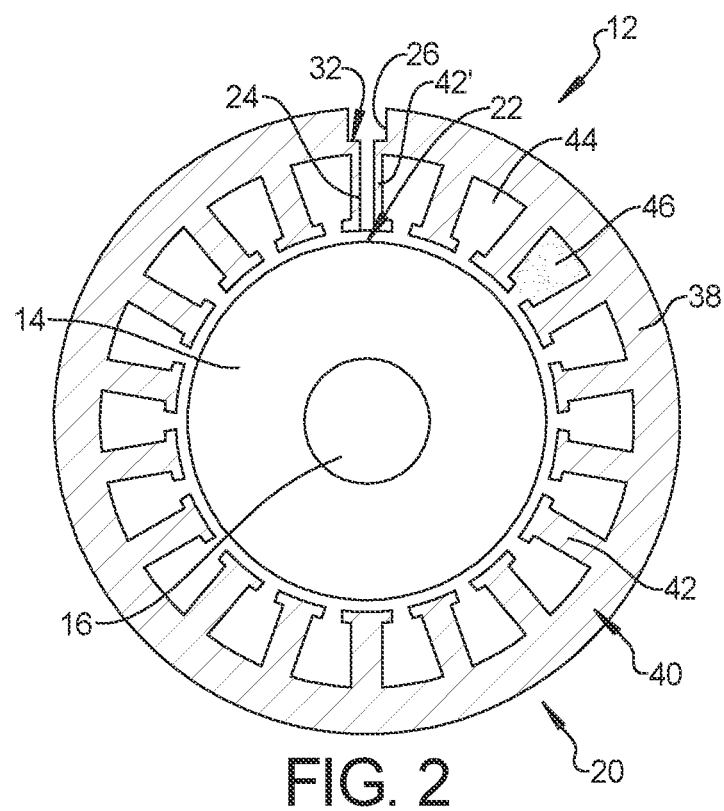
FIG. 2 is a cross-sectional end elevational view taken at section 2 of FIG. 1.

Referring to FIG. 3 and again to FIG. 2, a flow diagram 48 presents method steps for use of the apparatus and method for rotor temperature measurement 10. Following a start step 50, in an obtaining step 52, multiple items are obtained from vehicle sensor data. These include a motor oil temperature $T_{oil}$; an infrared sensor stator temperature signal IR_stator_raw and an infrared sensor rotor signal IR_rotor_raw. This is followed by obtaining an object emissivity ε_obj of the rotor 14, identifying a predetermined transmission rate τ_atm, an atmospheric temperature T_atm, and a temperature at the infrared sensor T_optic. An initial reflected sensed temperature T_refl_initial is assumed to be equal to the motor oil temperature $T_{oil}$ of the motor 12.

Following the obtaining step 52 if a motor oil temperature 54 $T_{oil}$ is less than 40° C. multiple independent temperature calibration steps may be performed. These include in a first temperature calibration step 56 applying a temperature calibration range 1 having a temperature ranging from −30° C. to 55° C. Following the first temperature calibration step 56 if an initial reflected temperature 58 $T_{IR}$<40° C. the program moves to an equation application step 60.

Following the first temperature calibration step 56 if an initial reflected temperature 61 $T_{IR}$>=40° C. the program moves to a second temperature calibration step 62. In the second temperature calibration step 62, because the $T_{IR}$ temperature is greater than or equal to 40° C. a temperature calibration range 2 ranging from 35° C. to 150° C. is applied. Following the second temperature calibration step 62 if the initial reflected temperature $T_{IR}$<140° C. the program moves directly to the equation application step 60.

Following the first temperature calibration step 56 if an initial reflected temperature 66 $T_{IR}$>=140° C. the program moves to a third temperature calibration step 68. In the third temperature calibration step 68, because the $T_{IR}$ temperature is greater than or equal to 140° C. a temperature calibration range 3 ranging from 80° C. to 220° C. is applied. Following the third temperature calibration step 68 the program moves directly to the equation application step 60.

During the equation application step 60, a below defined Equation 1 is applied to obtain an initial rotor temperature T_rotor_initial and a stator temperature T_stator.

In parallel temperature calibration steps, following the obtaining step 52 if the oil temperature $T_{oil}$ 70 is greater than or equal to 40° C., in a fourth temperature calibration step 72 the above noted temperature calibration range 2 of 35° C. to 150° C. is applied. During the fourth temperature calibration step 72, if an initial reflected temperature 76 $T_{IR}$<140° C. the program moves directly to the equation application step 60.

Following the fourth temperature calibration step 72 if an initial reflected temperature 76 $T_{IR}$>=140° C. the program moves to a fifth temperature calibration step 78. In the fifth temperature calibration step 78, because the initial reflected temperature 76 $T_{IR}$ is greater than or equal to 140° C. the above noted temperature calibration range 3 ranging from 80° C. to 220° C. is applied. Following the fifth temperature calibration step 78 the program moves directly to the equation application step 60.

The rotor surface emission and reflection calibration increases rotor temperature measurement accuracy without increasing emissivity (e.g., painting on the rotor surface). The rotor surface emission and reflection calibration applied in the equation application step 60 involves solving Equation 1 below to determine a rotor temperature ($T_{rotor}$) as a reflected temperature $T_{refl}$.

$$W_{tot}=(1-\varepsilon_{obj})\cdot\tau_{atm}\cdot\sigma\cdot(T_{refl})^4+\varepsilon_{obj}\cdot\tau_{atm}\cdot\sigma\cdot(T_{obj})^4+(1-\tau_{atm})\cdot\sigma\cdot(T_{atm})^4 \quad \text{Equation 1:}$$

In Equation 1 above, a total radiation $W_{tot}$ received by the sensor 34 is equal to multiple items including [an emission of surroundings reflected by a target defining at least the surface of the rotor]+[an emission of the target]+[an absorption through the atmosphere and external optics]. In Equation 1, the $\varepsilon_{obj}$ is a predetermined emissivity based on an RPM of the rotor 14. In Equation 1, the $T_{atm}$ is a predetermined transmission rate.

Following the equation application step 60 in a temperature reflected determination step 80 the temperature reflected $T_{refl}$ from Equation 1 above is determined using an Equation 2 as follows:

$$T_{refl}=C_{refl}\times[(T_{rotor}+T_{stator})/2] \quad \text{Equation 2:}$$

Equation 2 is formulated by determining an averaged emission of the stator reflected by the rotor surface 22 through the first through aperture 24. According to several aspects, the reflector constant $C_{refl}$ applied in Equation 2 may be 0.85. According to other aspects, the reflector constant ($C_{refl}$) may be a value other than 0.85 which is dependent on the first through aperture diameter selected and a location of the first through aperture 24.

Figure 3:
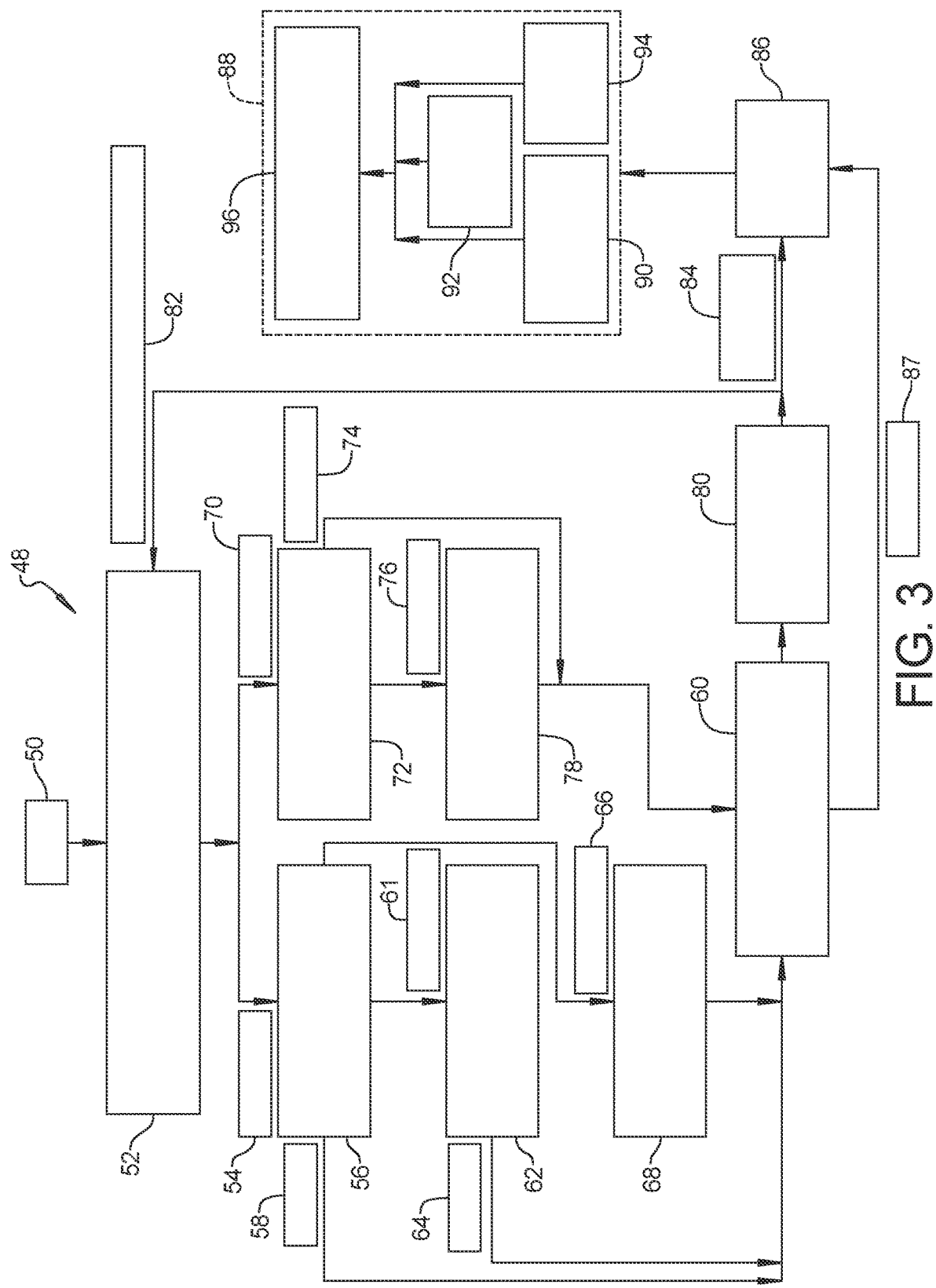
FIG. 3 is a flow diagram presenting steps for performing the method of the present disclosure.

With continuing reference to FIG. 3, following completion of the temperature reflected determination step 80 the program returns to the obtaining step 52 but replaces the initial reflected sensed temperature T_refl_initial which was assumed to be equal to the motor oil temperature $T_{oil}$ of the motor 12 with the calculated value of $T_{refl}$ identified using Equation 2 in the temperature reflected determination step 80. At least a second iteration of the program using the flow diagram 48 is then completed. A second iteration complete signal 84 is then generated after which in a forwarding step 86 values of the rotor temperature T_rotor and the stator temperature T_stator are forwarded to a vehicle controller 88. The vehicle controller may include a motor heat generation model 90, a heat transfer model 92 and a coolant flow model 94, which collectively provide input to generator a motor temperature 96.

Figure 4:
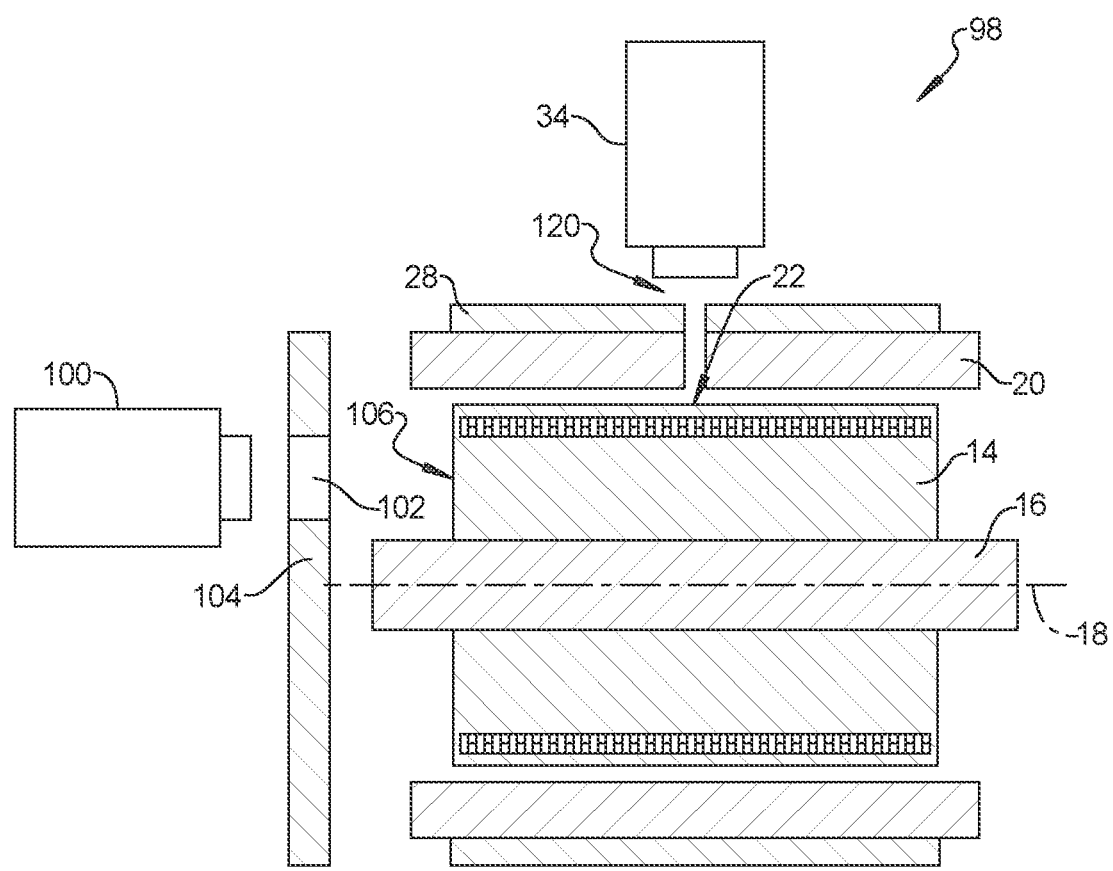
FIG. 4 is a front elevational view of a motor having first and second sensors of the present disclosure.

Referring to FIG. 4 and again to FIGS. 1 through 3, a validation 98 may be performed using output signals from the sensor 34, which are compared to signals that can be received from a second sensor 100, which may also be an infrared detector. A third aperture 102 may be created in a housing portion 104 which permits temperature measurement of an outer surface 106 of the rotor 14, used to confirm agreement with the temperature measurements received from the sensor 34. The use of the second sensor 100 may be solely as a confirmation or may be used as a redundant component together with the sensor 34.

With continuing reference to FIG. 4 and again to FIG. 1, an air gap 120 is present between the lens 114 of the sensor 134 and the housing 28 and the rotor surface 22 and between the lens 114 of the sensor 134 and the stator surface 32. The air gap 120 minimizes heat transfer to the sensor 34 and thereby provides a non-contact mid-rotor temperature measurement in the air gap using the infrared thermal detector or sensor 34.

A step-aperture defined by a combination of the first through aperture 24 and the second through aperture 26 is made in one of multiple stator laminations 38 defining an infrared radiation pathway to enable simultaneous infrared sensing on both the rotor surface 22 and the stator surface 32. The first through aperture 24 extends through a stator lamination tooth 42 between stator windings 46.

The rotor temperature measurement location is on the rotor surface 22 in the air gap 120. The present rotor surface emission and reflection calibration method increases temperature measurement accuracy compared to known temperature estimation algorithms.

An apparatus and method for rotor temperature measurement 10 of the present disclosure offers several advantages. These include a methodology that enables non-contact mid-rotor temperature measurement in an air gap using a sensor such as an infrared thermal detector. The methodology also includes a rotor surface emission and reflection calibration method to increase measurement accuracy. The methodology further includes a step-aperture created in a stator lamination defining an infrared radiation pathway which enables simultaneous infrared sensing on a surface of the rotor and on a surface of the stator. The through aperture extends through a stator lamination tooth between copper windings. The rotor temperature measurement location is at the rotor surface in the air gap.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An apparatus for automobile vehicle rotor temperature measurement, comprising:
   a motor having a rotor;
   a stator with the rotor positioned within the stator, the stator having a stator surface;
   a first aperture or opening extending through the stator;
   a sensor positioned in alignment with the first aperture sensing a temperature of at least a surface of the rotor, the sensor having a lens; and
   an air gap between the lens of the sensor and the rotor, the air gap minimizing a heat transfer to the sensor from the rotor and providing a non-contact rotor temperature measurement in the air gap, and
   wherein the air gap is disposed between the lens of the sensor and the stator surface.

2. The apparatus of claim 1, wherein the first aperture defines a step aperture extending through the stator.

3. The apparatus of claim 2, further including a second aperture or opening extending through a housing supporting the sensor, wherein a diameter of the first aperture is smaller than a diameter of the second aperture.

4. The apparatus of claim 3, further including a stator surface visible to the sensor through the second aperture.

5. The apparatus of claim 1, wherein the air gap is further located between a housing supporting the sensor and the surface of the rotor.

6. The apparatus of claim 1, wherein the stator includes multiple teeth, with the first aperture extending through at least one of the multiple teeth.

7. The apparatus of claim 1, wherein the sensor defines an infrared detector.

8. A method for automobile vehicle rotor temperature measurement for a motor, comprising:
   positioning a rotor of the motor within a stator of the motor;
   creating a first aperture or opening extending through the stator;
   aligning a sensor with the first aperture;

operating the sensor to sense a temperature of at least a surface of the rotor; and receiving a total radiation $W_{tot}$ by the sensor equal to [an emission of surroundings reflected by a target defining the surface of the rotor]+[an emission of the target]+[an absorption through an atmosphere and external optics].

9. The method of claim 8, further including shaping the first aperture as a step aperture extending through the stator and further including a second aperture or opening extending through a housing supporting the sensor, with a stator surface visible to the sensor through the second aperture.

10. The method of claim 9, further including selecting the sensor as an infrared detector sensing the surface of the rotor and the stator surface.

11. The method of claim 8, further including extending the aperture through at least one of multiple teeth of the stator.

12. The method of claim 8, further including:
assuming an initial reflected sensed temperature T_refl_initial of the surface of the rotor to be equal to a motor oil temperature $T_{oil}$ of the motor or a stator temperature if the motor oil as a coolant oil is not available; and
calculating a reflected temperature $T_{refl}$ which is equal to a constant $C_{refl}$ multiplied by [a rotor temperature $T_{rotor}$ plus a stator temperature $T_{stator}$] divided by two.

13. The method of claim 12, further including:
substituting the reflected temperature $T_{refl}$ for the initial reflected sensed temperature T_refl_initial of the surface of the rotor; and
performing at least a second iteration of the calculating the reflected temperature $T_{refl}$.

14. A method for automobile vehicle rotor temperature measurement of a motor, comprising:
positioning a rotor of the motor within a stator of the motor;
aligning an infrared sensor with a surface of the rotor;
in an obtaining step obtaining multiple items from vehicle sensor data including a motor oil temperature $T_{oil}$; an infrared sensor stator temperature signal IR_stator_raw, an infrared sensor rotor signal IR_rotor_raw, an object emissivity ε_obj of the rotor, a predetermined transmission rate τ_atm, an atmospheric temperature T_atm, and a temperature at the sensor T_optic, wherein an initial reflected sensed temperature T_refl_initial is assumed to be equal to the motor oil temperature $T_{oil}$ of the motor;
performing a first temperature calibration if the motor oil temperature $T_{oil}$ is less than 40° C. or a second temperature calibration if the motor oil temperature $T_{oil}$ is equal to or greater than 40° C.; and
calculating a value of a reflected temperature $T_{refl}$ which is equal to a constant $C_{refl}$ multiplied by [a rotor temperature $T_{rotor}$ plus a stator temperature $T_{stator}$] divided by two.

15. The method of claim 14, further including performing at least a second iteration after determining the reflected temperature $T_{refl}$ by returning to the obtaining step and replacing the initial reflected sensed temperature T_refl_initial initially assumed to be equal to the motor oil temperature $T_{oil}$ of the motor with the value of the reflected temperature $T_{refl}$.

16. The method of claim 14, further including extending a step-aperture in a stator lamination defining an infrared radiation pathway from the infrared sensor to enable simultaneous infrared sensing on the surface of the rotor and on a surface of the stator.

\* \* \* \* \*